United States Patent
Peter

(10) Patent No.: US 8,511,391 B2
(45) Date of Patent: Aug. 20, 2013

(54) APPARATUS AND METHOD FOR COUPLING CONDUIT SEGMENTS

(75) Inventor: Andreas Peter, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 186 days.

(21) Appl. No.: 12/841,262

(22) Filed: Jul. 22, 2010

(65) Prior Publication Data
US 2011/0018262 A1 Jan. 27, 2011

Related U.S. Application Data

(60) Provisional application No. 61/227,602, filed on Jul. 22, 2009.

(51) Int. Cl.
*E21B 17/02* (2006.01)
(52) U.S. Cl.
USPC .................................. 166/380; 166/242.6
(58) Field of Classification Search
USPC ............................. 166/242.6, 380
See application file for complete search history.

(56) References Cited

U.S. PATENT DOCUMENTS

| | | |
|---|---|---|
| 2004/0045719 A1 | 3/2004 | Moore et al. |
| 2005/0116468 A1 | 6/2005 | Otten |
| 2005/0194183 A1 | 9/2005 | Gleitman et al. |
| 2009/0084541 A1* | 4/2009 | Braden .................. 166/242.6 |
| 2010/0175890 A1* | 7/2010 | Bray et al. ............... 166/378 |

FOREIGN PATENT DOCUMENTS

EP 0261291 A1 3/1988

OTHER PUBLICATIONS

Notification of Transmittal of the International Search Report and the Written Opinion of the International Searching Authority, or the Declaration; PCT/US2010/042914; Mar. 2, 2011.
Michael J. Jellison, "Drill Pipe and Drill Stem Technology"; Drilling Contractor, Mar./Apr. 2007, pp. 16-22.

* cited by examiner

*Primary Examiner* — William P Neuder
(74) *Attorney, Agent, or Firm* — Cantor Colburn LLP

(57) ABSTRACT

A method of coupling segments of a borehole conduit is disclosed. The method includes: positioning a first conduit segment at a location selected from a surface location and a downhole location, the first conduit segment having a first end and a second end, the first conduit segment including a pin connector at the first end; orienting the first conduit segment so that the first end is located uphole relative to the second end; and coupling a second conduit segment in operable communication with the first conduit segment, the second conduit segment having a box connector at an end of the second conduit segment that is configured to engage the pin connector of the first segment.

20 Claims, 7 Drawing Sheets

APPARATUS AND METHOD FOR COUPLING CONDUIT SEGMENTS

CROSS-REFERENCE TO RELATED APPLICATIONS AND PRIORITY CLAIM

This application claims the benefit of U.S. Provisional Application Ser. No. 61/227,602, entitled "APPARATUS AND METHOD FOR COUPLING CONDUIT SEGMENTS", filed Jul. 22, 2009, under 35 U.S.C. §119(e), which is incorporated herein by reference in its entirety.

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string. As the string is lowered into the borehole, additional pipe segments are coupled to the string by various coupling mechanisms, such as threaded couplings.

Various power and/or communication signals may be transmitted through the pipe segments via a "wired pipe" configuration. Such configurations include electrical, optical or other conductors extending along the length of selected pipe segments. The conductors are operably connected between pipe segments by a variety of coupling configurations.

One such coupling configuration includes a threaded male-female configuration often referred to as a pin box connection. The pin box connection includes a male member, i.e., a "pin" that includes an exterior threaded portion, and a female member, i.e., a "box", that includes an interior threaded portion and is configured to receive the pin in a threaded connection.

Some wired pipe configurations include a transmission device mounted on the tip of the pin. However, such transmission devices can be easily damaged because of the exposed mounting location, such as when the pipe segment is racked back onto a derrick. Devices such as thread protectors may help to some degree, but are time consuming to use and add additional complexity and expense.

BRIEF DESCRIPTION

Disclosed herein is a method of coupling segments of a borehole conduit. The method includes: positioning a first conduit segment at a location selected from a surface location and a downhole location, the first conduit segment having a first end and a second end, the first conduit segment including a pin connector at the first end; orienting the first conduit segment so that the first end is located uphole relative to the second end; and coupling a second conduit segment in operable communication with the first conduit segment, the second conduit segment having a box connector at an end of the second conduit segment that is configured to engage the pin connector of the first segment.

Also disclosed herein is a borehole conduit including: a first conduit segment configured to be disposed in a borehole, the first conduit segment having a first end and a second end, the first conduit segment including a pin connector at the first end and configured to be oriented so that the first end is located uphole relative to the second end; and a second conduit segment configured to be coupled in operable communication with the first conduit segment, the second conduit segment having a box connector at an end of the second conduit segment that is configured to engage the pin connector of the first segment.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system, apparatus and method are presented herein by way of exemplification and not limitation with reference to the Figures.

Figure 1:
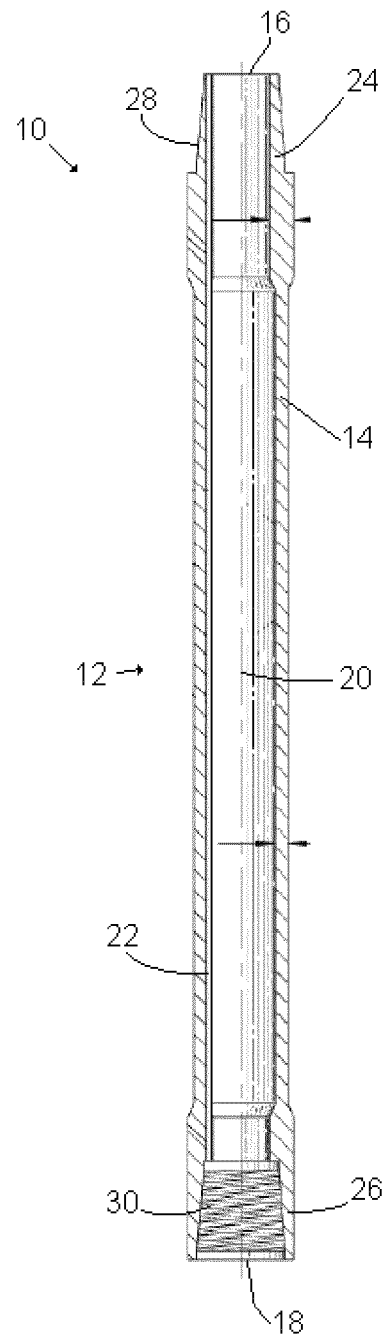
FIG. 1 depicts an exemplary embodiment of a conduit segment of a well drilling and/or logging system.

Referring to FIG. 1, an exemplary embodiment of a portion of a well drilling, logging and/or production system 10 includes a conduit or string 12, such as a drillstring or production string, that is configured to be disposed in a borehole for performing operations such as drilling the borehole, making measurements of properties of the borehole and/or the surrounding formation downhole, and facilitating hydrocarbon production.

For example, during drilling operations, drilling fluid or drilling "mud" is introduced into the string 12 from a source such as a mud tank or "pit" and is circulated under pressure through the string 12, for example via one or more mud pumps. The drilling fluid passes into the string 12 and is discharged at the bottom of the borehole through an opening in a drill bit located at the downhole end of the string 12. The drilling fluid circulates uphole between the string 12 and the borehole and is discharged into the mud tank or other location.

The string 12 includes at least one string or pipe segment 14 having an uphole end 16 and a downhole end 18. As described herein, "uphole" refers to a location near the surface relative to a reference location when the segment 14 is disposed in a borehole, and "downhole" refers to a location away from the surface relative to the reference location.

An inner bore or other conduit 20 extends along the length of each segment 14 to allow drilling mud or other fluids to flow therethrough. A communication conduit 22 is located within the segment 14 to provide protection for electrical, optical or other conductors to be disposed along the segment 14.

The segment 14 includes an uphole coupling 24 and a downhole coupling 26. The segment 14 is configured so that the uphole coupling 24 is positioned at an uphole location relative to the downhole coupling 26. The uphole coupling 24 includes a male coupling portion 28 having an exterior threaded section, and is referred to herein as a "pin" 24. The downhole coupling 26 includes a female coupling portion 30 having an interior threaded section, and is referred to herein as a "box" 26.

The pin 24 and the box 26 are configured so that the pin 24 can be disposed within the box 26 to effect a fixed connection therebetween to connect the segment 14 with an adjacent segment 14 or other downhole component. In one embodiment, the exterior of the male coupling portion 28 and the interior of the female coupling portion 30 are tapered along the length of the segment 14 to facilitate coupling. Although the pin 24 and the box 26 are described has having threaded portions, the pin 24 and the box 26 may be configured to be coupled using any suitable mechanism, such as bolts or screws or an interference fit.

Figure 2:
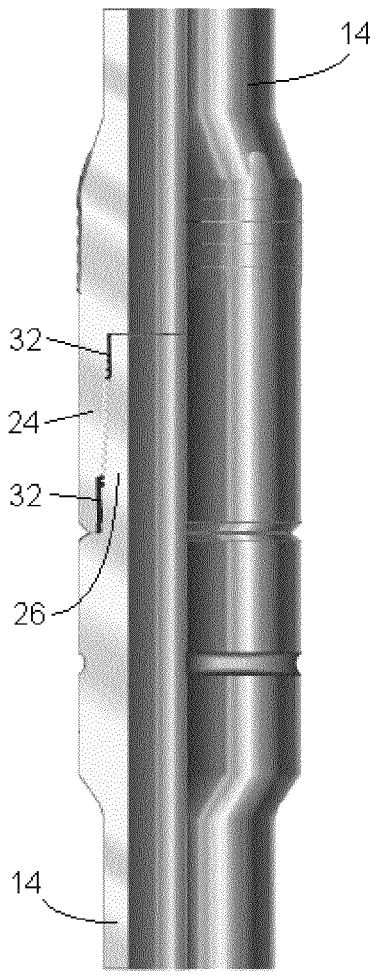
FIG. 2 depicts a plurality of the conduit segments of FIG. 1 in operable engagement.
Figure 3:
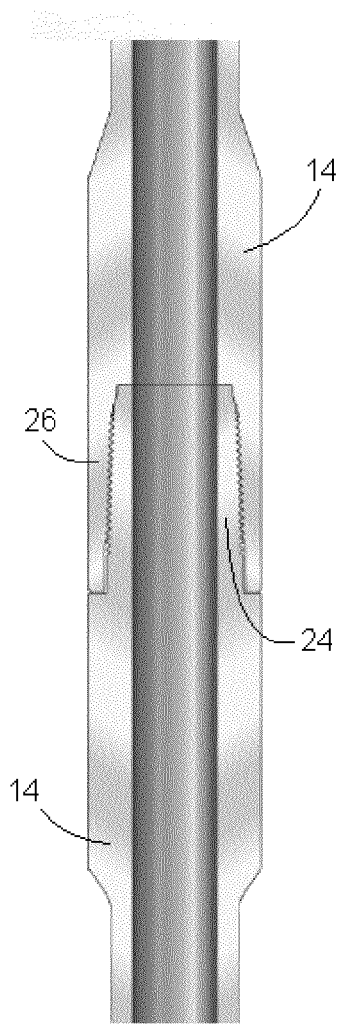
FIG. 3 depicts a plurality of the conduit segments of FIG. 1 in operable engagement.

Referring to FIGS. 2 and 3, adjacent segments 14 are shown in a coupled position, where the pin 24 is disposed in and engaged with the box 26. When the pin 24 is fully engaged with the box 26, at least one seal 32 is formed between surfaces on the pin 24 and the box 26. In one embodiment, the pin 24 includes multiple sealing surfaces that contact corresponding surfaces on the box 26 to form one or more seals 32. The sealing configurations described herein are exemplary. Other sealing configurations such as o-rings, gaskets and packings may be utilized in addition to or in place of the sealing surfaces described herein.

Figure 4:
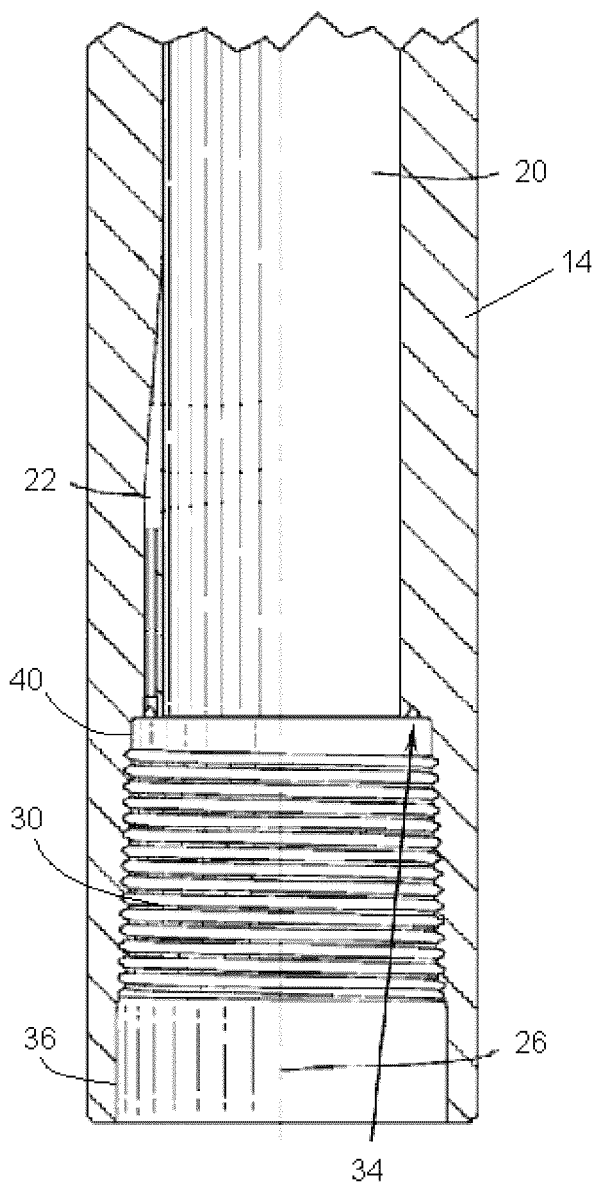
FIG. 4 depicts an exemplary embodiment of a pin box connector of the segment of FIG. 1.
Figure 5:
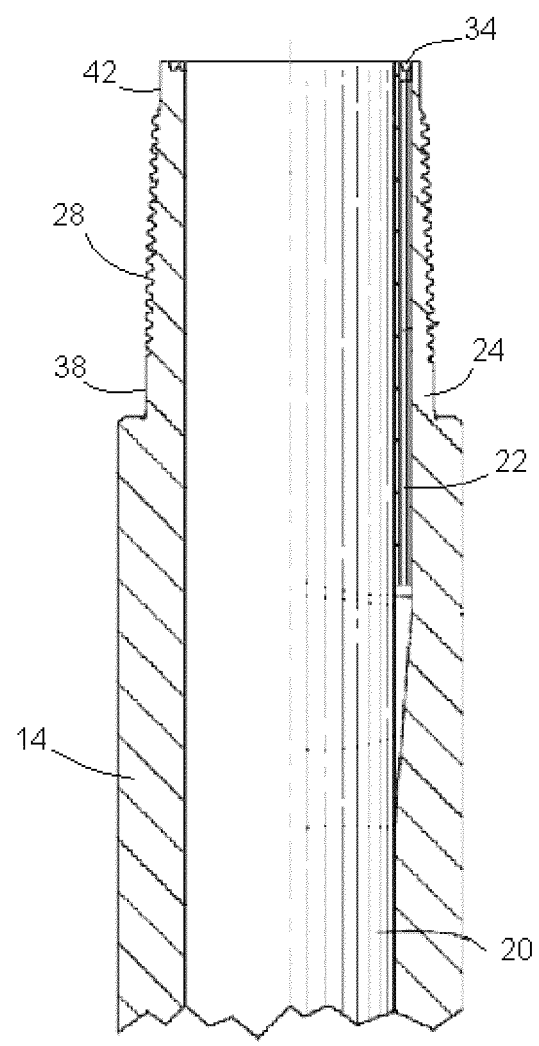
FIG. 5 depicts an exemplary embodiment of a pin connector of the segment of FIG. 1.

Referring to FIGS. 4 and 5, the segment 14 includes at least one transmission device 34 disposed therein and located at the pin 24 and/or the box 26. The transmission device 34 is configured to provide communication between conductors disposed in adjacent segments 14 when the pin 24 and the box 26 are engaged. The transmission device 34 may be of any suitable type, such as an inductive coil, direct electrical contacts and an optical connection ring. In the configuration described herein, the transmission device 34 is protected from mechanical damage due to the uphole position of the pin 24 and/or due to the position of the transmission device 34 in the box 26.

The position of the transmission device 34 is exemplary. The transmission device 34 may be disposed at any suitable location. In one example, the transmission device 34 is recessed within or mounted on a surface of the pin 24 and/or the box 26. In another example, the transmission device 34 is located at the uphole end of the pin 24 and/or the uphole end of the box 26. In one embodiment, shown in FIGS. 4 and 5, the transmission device 34 is recessed in an interior uphole surface of the box 26 and a corresponding transmission device 34 is mounted on an exterior uphole surface of the pin 24.

In one embodiment, the pin 24 and the box 26 include corresponding sealing surfaces configured to create a seal 32 when the pin 24 and the box 26 are engaged. In one embodiment, each sealing surface is configured to contact a corresponding sealing surface to create a watertight and/or airtight seal therebetween.

In one embodiment, the box 26 includes a first interior sealing surface or bore 36 located at a downhole portion of the pin box interior. The pin 24 includes, in one embodiment, a first exterior sealing surface or counterbore 38 located at a downhole portion of the pin exterior. Upon engagement between the threads of the male portion 28 and the female portion 30, the first bore 36 and the first counterbore 38 come into contact with one another to form a seal 32.

In one embodiment, the box 26 includes an additional interior sealing surface or bore 40 located at an uphole portion of the box interior. The pin 24 includes an additional exterior sealing surface or counterbore 42 located at an uphole portion of the pin exterior. Upon engagement between the threads of the male portion 28 and the female portion 30, the additional bore 40 and the additional counterbore 42 come into contact with one another to form a seal 32.

In one embodiment, one or more of the sealing surfaces 36, 38, 40, 42 are smooth bore surfaces that are generally parallel to the interior surface of the inner conduit 20. The sealing surfaces may take any suitable shape or configuration, such as a smooth or grooved shape, a curved shape, tapered shape or cylindrical shape.

In one embodiment, the first bore 36 is an outer bore having a diameter greater than the diameter of the additional bore 40, referred to as an inner bore. The threaded portion of the box 26 is tapered along the length of the segment 14. The threaded portion has a diameter that is substantially equal to the diameter of the first bore 36 at the downhole end of the threaded portion, and the diameter gradually decreases along the length of the segment 14 to a diameter that is substantially equal to the diameter of the additional bore 40 at the uphole end of the threaded portion.

Correspondingly, the first counterbore 38 is an inner counterbore having a diameter greater than the additional counterbore 42. The threaded portion of the pin 24 is tapered similarly to the tapered portion of the box 26. The threaded portion of the pin 24 has a diameter that is substantially equal to the first counterbore 38 at the uphole end of the threaded portion, and the diameter gradually decreases along the length of the segment 14 to a diameter that is substantially equal to the diameter of the additional counterbore 42.

The sealing configurations described herein are exemplary. The position and number of sealing surfaces are not limited, and the sealing surfaces may be located at any desired position to affect an airtight and/or watertight seal between the pin 24 and the box 26.

The segment 14, the pin 24 and/or the box 26 are made from any material, including a metal such as steel and aluminum. In addition, the sealing surfaces 36, 38, 40, 42 are made of any suitable material, such as a metal, and may also be made of a combination of materials such as metallic materials and deformable and/or resilient materials, such as plastic and rubber materials.

In one embodiment, the system 10 is operably connected to a downhole or surface processing unit which may act to control various components of the system 10, such as drilling, logging and production components or subs. Other components include machinery to raise or lower segments 14 and operably couple segments 14, and transmission devices. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, the string 12 is configured as a drillstring, hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

Figure 6:
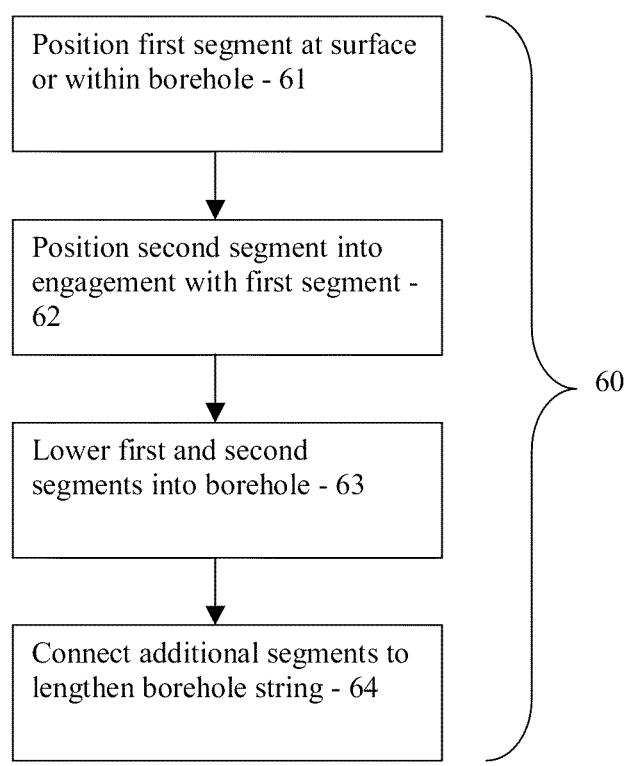
FIG. 6 depicts a flow chart providing an exemplary method of coupling segments of a borehole conduit.

FIG. 6 illustrates a method 60 for coupling segments of a borehole conduit or string such as a wired pipe. The method 60 includes one or more stages 61-64. The method 60 is described herein in conjunction with the system 10, although the method 60 may be performed in conjunction with any number and configuration of rigs, processors or other machinery. In one embodiment, the method 60 includes the execution of all of stages 61-64 in the order described. However, certain stages may be omitted, stages may be added, or the order of the stages changed.

In the first stage 61, a first segment 14 is lowered or otherwise positioned or suspended at a surface location or within a borehole. The first segment includes the uphole end 16 and the downhole end 18. The first segment 14 is generally oriented so that the pin 24 is positioned at the uphole end 16 of the first segment 14. In one embodiment, the first segment 14 includes drilling components such as a drill bit and/or additional components such as various measurement devices. In one embodiment, the first segment 14 includes the box 26 at the downhole end 18 that is configured to be connected to another segment 14 by engagement with a corresponding pin 24 located at an uphole end 16 of the other segment 14.

In the second stage 62, a second segment 14 is lowered onto or otherwise positioned into engagement with the first segment 14. The second segment includes at least the box 26 located at the downhole end 18 of the second segment. In one embodiment, the second segment is positioned so that the threaded portions of the pin 24 and the box 26 are engaged, and the second segment 14 is rotated relative to the first segment 14 to fully engage the segments 14 in a sealing connection. In one embodiment, fully engaging the segments 14 includes positioning the transmission device 34 in one of the first and second segments 14 in operable communication with a corresponding transmission device 34 and/or a conductor in the other of the first and second segments 14. In one embodiment, the second segment 14 includes a pin 24 at its uphole end 16 to facilitate connection with additional segments 14.

In the third stage 63, the first and second segments 14 are lowered into the borehole. The segments 14 may be lowered into the borehole during or after a drilling operation.

In the fourth stage 64, additional segments 14 are connected together via respective pins 24 and boxes 26 to further lengthen the string and lower the string 12 into the borehole.

In one embodiment, the segments 14 are lowered or otherwise positioned by use of a drilling rig supported by a derrick or other structure. In one embodiment, the segments 14 are placed on fingerboards or other support structures prior to lowering the segments 14 into the borehole or after racking the segments 14 back from the borehole.

Figure 7:
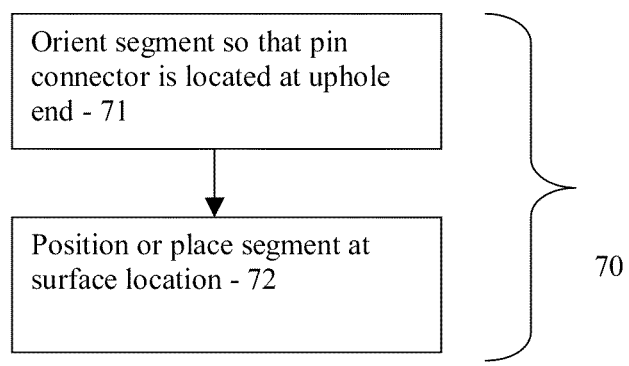
FIG. 7 depicts a flow chart providing an exemplary method of positioning a segment of a borehole conduit.

FIG. 7 illustrates a method 70 for positioning a segment of a borehole conduit at a location such as on a derrick or other support structure. The method 70 includes one or more stages 71-72. The method 70 is described herein in conjunction with the system 10, although the method 70 may be performed in conjunction with any number and configuration of rigs, processors or other machinery. In one embodiment, the method 70 includes the execution of all of stages 71-72 in the order described. However, certain stages may be omitted, stages may be added, or the order of the stages changed.

In the first stage 71, a segment 14 is oriented so that the pin 24 is located at the uphole end 16 and/or the box 26 is located at the downhole end 18. Although the segment 14 is described herein as having both a pin 24 and a box 26, the segment 14 may include only one of the pin 24 or the box 26.

In the second stage 72, the segment 14 is positioned at a surface location such as a derrick of a drilling rig. In one embodiment, the segment 14 is placed on a fingerboard or other storage structure supported by the derrick or located at another surface location.

In one embodiment, the method 70 is performed as the segment 14 is racked back from a borehole. In another embodiment, the method 70 is performed prior to lowering the segment 14 into a borehole during a drilling, logging, production or other operation.

The apparatuses and methods described herein provide various advantages over existing methods and devices, in that the configuration of the pin and box prevents damage to the transmission device, for example, when the pipe segments are racked to a derrick. For example, the transmission device on the bottom of the pipe segment is no longer exposed to mechanical damage when the pipe segment is stored at the surface, because it is mounted deep inside the box. In addition, the transmission device is no longer exposed to damage from the weight of the pipe segment when the pipe segment is stored at the surface. The configuration described herein ensures that transmission devices located in the box and/or on the pin are protected from being mechanically damaged by the weight of the segment or by other external forces. In addition, sealing surfaces such as a shoulder surface in the box and nose surface on the pin are protected from damage.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of coupling segments of a borehole conduit comprising:
   positioning a first conduit segment at a location selected from a surface location and a downhole location, the first conduit segment having a first end and a second end, the first conduit segment including a first connector at the first end and a second connector at the second end, the first connector being a pin connector, and the first conduit segment including a communication conduit extending within a metal body of the first conduit segment along a length of the first conduit segment between the first connector and the second connector, the communication conduit configured to provide protection for a conductor extending between the first connector and the second connector;

orienting the first conduit segment so that the first end is located uphole relative to the second end; and coupling a second conduit segment in operable communication with the first conduit segment, the second conduit segment having a box connector at an end of the second conduit segment that is configured to engage the pin connector of the first conduit segment, one of the pin connector and the box connector including a first transmission element mounted on an outer surface of the pin connector or the box connector and the other of the pin connector and the box connector including a second transmission element located in a recess of the pin connector or box connector, such that coupling the second conduit segment with the first conduit segment inserts the first transmission element of the one of the pin connector or the box connector into the recess of the other of the pin connector or box connector.

2. The method of claim 1, further comprising coupling the first conduit segment to an additional conduit segment by engaging an additional pin connector of the additional conduit segment with a box connector at the second end.

3. The method of claim 1, wherein the pin connector is a male coupling portion having an external threaded section, and the box connector is a female coupling portion having an interior threaded section.

4. The method of claim 1, wherein coupling the second conduit segment with the first conduit segment includes forming a seal between the second conduit segment and the first conduit segment by at least one sealing configuration included in at least one of the pin connector and the box connector.

5. The method of claim 1, wherein coupling the second conduit segment with the first conduit segment includes forming a seal between the second conduit segment and the first conduit segment by engaging a first surface on the pin connector with a second surface on the box connector to form a seal.

6. The method of claim 5, wherein the first surface is located at a downhole portion of an exterior of the pin connector, and the second surface is located at a downhole portion of an interior of the box connector.

7. The method of claim 1, wherein the first conduit segment includes at least one first conductor disposed therein, the second conduit segment includes at least one second conductor disposed therein, and coupling the second conduit segment with the first conduit segment includes operably connecting the at least one first conductor to the at least one second conductor by a transmission device included in at least one of the pin connector and the box connector.

8. The method of claim 7, wherein the transmission device is disposed on at least one of an uphole end of the pin connector and an uphole end of the box connector.

9. The method of claim 7, wherein the transmission device is disposed on at least one of an exterior surface of the pin connector and an interior surface of the box connector.

10. The method of claim 7, wherein the transmission device is selected from at least one of an inductive coil, a direct electrical contact and an optical connector.

11. A borehole conduit comprising:

a first conduit segment configured to be disposed in a borehole, the first conduit segment having a first end and a second end, the first conduit segment including a first connector at the first end and a second connector at the second end, the first connector being a pin connector, the first conduit segment including a communication conduit extending within a metal body of the first conduit segment along a length of the first conduit segment between the first connector and the second connector, the communication conduit configured to provide protection for a conductor extending between the first connector and the second connector and the first conduit segment configured to be oriented so that the first end is located uphole relative to the second end; and a second conduit segment configured to be coupled in operable communication with the first conduit segment, the second conduit segment having a box connector at an end of the second conduit segment that is configured to engage the pin connector of the first segment, one of the pin connector and the box connector including a first transmission element mounted on an outer surface of the pin connector or the box connector and the other of the pin connector and the box connector including a second transmission element located in a recess of the pin connector or box connector, such that coupling the second conduit segment with the first conduit segment includes inserting the first transmission element of the one of the pin connector or the box connector into the recess of the other of the pin connector or box connector.

12. The borehole conduit of claim 11, wherein the first conduit segment includes a box connector at the second end configured to engage an additional pin connector of an additional conduit segment.

13. The borehole conduit of claim 11, wherein the pin connector is a male coupling portion having an external threaded section, and the box connector is a female coupling portion having an interior threaded section.

14. The borehole conduit of claim 11, wherein at least one of the pin connector and the box connector includes at least one sealing configuration.

15. The borehole conduit of claim 14, wherein the at least one sealing configuration includes a first surface on the pin connector configured to engage a second surface on the box connector to form a seal.

16. The borehole conduit of claim 15, wherein the first surface is located at a downhole portion of an exterior of the pin connector, and the second surface is located at a downhole portion of an interior of the box connector.

17. The borehole conduit of claim 11, wherein the first conduit segment includes at least one first conductor disposed therein, the second conduit segment includes at least one second conductor disposed therein, and at least one of the pin connector and the box connector includes a transmission device configured to operably connect the at least one first conductor to the at least one second conductor.

18. The borehole conduit of claim 17, wherein the transmission device is disposed on at least one of an uphole end of the pin connector and an uphole end of the box connector.

19. The borehole conduit of claim 17, wherein the transmission device is disposed on at least one of an exterior surface of the pin connector and an interior surface of the box connector.

20. The borehole conduit of claim 17, wherein the transmission device is selected from at least one of an inductive coil, a direct electrical contact and an optical connector.

* * * * *